US011405273B1

(12) United States Patent
Chen et al.

(10) Patent No.: US 11,405,273 B1
(45) Date of Patent: Aug. 2, 2022

(54) NETWORK DEVICE DATA ERASURE

(71) Applicant: Future Dial, Inc., Sunnyvale, CA (US)

(72) Inventors: Chen Chen, San Ramon, CA (US);
Jisheng Li, Los Altos, CA (US); Kun Cao, San Ramon, CA (US)

(73) Assignee: Future Dial, Inc., Sunnyvale, CA (US)

( * ) Notice: Subject to any disclaimer, the term of this patent is extended or adjusted under 35 U.S.C. 154(b) by 0 days.

(21) Appl. No.: 17/481,899

(22) Filed: Sep. 22, 2021

(51) Int. Cl.
| G06F 15/16 | (2006.01) |
| H04L 41/0816 | (2022.01) |
| H04L 41/0869 | (2022.01) |
| H04L 41/0654 | (2022.01) |
| H04L 41/0604 | (2022.01) |
| H04L 41/08 | (2022.01) |

(52) U.S. Cl.
CPC ...... *H04L 41/0816* (2013.01); *H04L 41/0627* (2013.01); *H04L 41/0654* (2013.01); *H04L 41/0869* (2013.01); *H04L 41/0886* (2013.01)

(58) Field of Classification Search
CPC ............. H04L 41/0816; H04L 41/0627; H04L 41/0654; H04L 41/0869; H04L 41/0886
USPC ........................................................ 709/217
See application file for complete search history.

(56) References Cited

U.S. PATENT DOCUMENTS

| 8,674,823 | B1 * | 3/2014 | Contario .................. H02J 1/10 |
| | | | 340/693.1 |
| 10,142,122 | B1 * | 11/2018 | Hill ..................... H04L 12/2807 |
| 10,397,013 | B1 * | 8/2019 | Hill ......................... H04L 67/36 |
| 2016/0267284 | A1 * | 9/2016 | Willis .................... H04L 63/08 |
| 2017/0371573 | A1 * | 12/2017 | Kim ...................... G06F 3/0619 |
| 2019/0373320 | A1 * | 12/2019 | Balsamo ........... H04M 1/72409 |
| 2020/0323030 | A1 * | 10/2020 | Mehta ................... H04W 84/18 |
| 2021/0195500 | A1 * | 6/2021 | Choi ..................... H04W 12/06 |
| 2021/0264037 | A1 * | 8/2021 | Allo ..................... G06F 21/6218 |
| 2022/0070262 | A1 * | 3/2022 | Kitchen ............. H04L 12/2803 |
| 2022/0078229 | A1 * | 3/2022 | Kitchen ............. H04L 12/2834 |
| 2022/0104015 | A1 * | 3/2022 | McDevitt ........... H04N 21/8106 |

* cited by examiner

*Primary Examiner* — Karen C Tang
(74) *Attorney, Agent, or Firm* — Greenberg Traurig

(57) ABSTRACT

A method includes determining, by a computer device, device information for a network device communicatively coupled to the computer device. The method includes retrieving, from a server device, a configuration file corresponding to the device information as determined. The method includes resetting the network device using the configuration file as retrieved. The method includes clearing user-addressable storage locations of the network device. The method includes outputting an indication of whether resetting the network device was successful and whether clearing the user-addressable storage locations of the network device was successful.

20 Claims, 6 Drawing Sheets

NETWORK DEVICE DATA ERASURE

FIELD OF THE TECHNOLOGY

At least some embodiments disclosed herein relate generally to network devices. More specifically, embodiments disclosed herein relate generally to network devices and erasing data from the network devices.

BACKGROUND

Network devices such as, but not limited to, network switches, routers, access points, network cards, and the like include configuration details specific to the particular device. These configuration details can be configured by a user. In some situations, the user may, for example, return a network device to the manufacturer or third party that may be interested in removing the configuration details specific to the particular device as configured by the user.

SUMMARY

In some embodiments, a method includes determining, by a computer device, device information for a network device communicatively coupled to the computer device. In some embodiments, the method includes retrieving, from a server device, a configuration file corresponding to the device information as determined. In some embodiments, the method includes resetting the network device using the configuration file as retrieved. In some embodiments, the method includes clearing user-addressable storage locations of the network device. In some embodiments, the method includes outputting an indication of whether resetting the network device was successful and whether clearing the user-addressable storage locations of the network device was successful.

In some embodiments, the method includes removing a passcode from the network device prior to determining the device information for the network device.

In some embodiments, in response to removing the passcode from the network device being unsuccessful, the method includes outputting an error message.

In some embodiments, the method includes determining whether a serial number in the configuration file corresponds to a format of allowed serial numbers, and outputting an indication of whether the serial number in the configuration file corresponds to the format of allowed serial numbers.

In some embodiments, in response to determining the serial number in the configuration file does not correspond to the format of allowed serial numbers, the method includes outputting an indication that the network device cannot be reset.

In some embodiments, resetting the network device using the configuration file as retrieved comprises performing a factory reset of the network device and backing up firmware of the network device.

In some embodiments, the method includes restoring the firmware of the network device after clearing the user-addressable storage locations of the network device.

In some embodiments, the method includes displaying the indication of whether resetting the network device was successful and whether clearing the user-addressable storage locations of the network device was successful.

In some embodiments, the method includes determining, by the computer device, device information for a second network device communicatively coupled to the computer device. In some embodiments, the method includes retrieving, from the server device, a second configuration file corresponding to the device information as determined. In some embodiments, the method includes resetting the second network device using the configuration file as retrieved. In some embodiments, the method includes clearing user-addressable storage locations of the second network device. In some embodiments, the method includes outputting an indication of whether resetting the second network device was successful and whether clearing the user-addressable storage locations of the second network device was successful.

In some embodiments, the second network device and the network device are connected communicatively coupled to the computer device for processing concurrently.

In some embodiments, a system includes a processing device. In some embodiments, the processing device is configured to execute instructions to determine, by a computer device, device information for a network device communicatively coupled to the computer device. In some embodiments, the processor is configured to retrieve, from a server device, a configuration file corresponding to the device information as determined. In some embodiments, the processor is configured to reset the network device using the configuration file as retrieved. In some embodiments, the processor is configured to clear user-addressable storage locations of the network device. In some embodiments, the processor is configured to output an indication of whether resetting the network device was successful and whether clearing the user-addressable storage locations of the network device was successful. In some embodiments, the system includes a display device configured to display a graphical user interface (GUI) based on the indication.

In some embodiments, the system includes a device, wherein the device includes a plurality of ports for concurrently communicatively coupling the network device to the computer device along with a second network device.

In some embodiments, each port of the plurality of ports includes a power inlet, a first communication inlet, and a second communication inlet.

In some embodiments, the first communication inlet is a universal serial bus (USB) port.

In some embodiments, the second communication inlet is an ethernet port.

In some embodiments, the processing device is configured to remove a passcode from the network device prior to determining the device information for the network device.

In some embodiments, in response to removing the passcode from the network device being unsuccessful, the processing device is configured to output an error message In some embodiments, resetting the network device using the configuration file as retrieved comprises performing a factory reset of the network device and backing up firmware of the network device.

In some embodiments, the processing device is configured to determine whether a serial number in the configuration file corresponds to a format of allowed serial numbers, and outputting an indication of whether the serial number in the configuration file corresponds to the format of allowed serial numbers.

In some embodiments, a non-transitory computer-readable storage medium includes instructions, that when executed by a processor, cause the processor to perform a method. In some embodiments, the method includes determining, by a computer device, device information for a network device communicatively coupled to the computer device. In some embodiments, the method includes retrieving, from a server device, a configuration file corresponding to the device information as determined. In some embodiments, the method includes resetting the network device using the configuration file as retrieved. In some embodiments, the method includes clearing user-addressable storage locations of the network device. In some embodiments, the method includes outputting an indication of whether resetting the network device was successful and whether clearing the user-addressable storage locations of the network device was successful.

BRIEF DESCRIPTION OF THE DRAWINGS

References are made to the accompanying drawings that form a part of this disclosure and illustrate embodiments in which the systems and methods described in this Specification can be practiced.

Like reference numbers represent the same or similar parts throughout.

DETAILED DESCRIPTION

Network devices such as, but not limited to, network switches, routers, access points, network cards, and the like include configuration details specific to the particular device. These configuration details can be configured by a user. In some situations, the user may, for example, return a network device to the manufacturer or third party that may be interested in removing the configuration details specific to the particular device as configured by the user. Improved methods for erasing and resetting the network devices are desired.

Embodiments of this disclosure relate generally to systems and methods for erasing network devices. In some embodiments, a system can include a computer device in electronic communication with a server device over a network to retrieve specific information for resetting corresponding network devices. In some embodiments, the systems and methods enable a portion of the instructions to be stored on the computer device and distributes the device specific information for resetting the corresponding network devices. In some embodiments, advantageously, the systems and methods described herein can reduce ability of improper access to a computer device to reset network devices.

Figure 1:
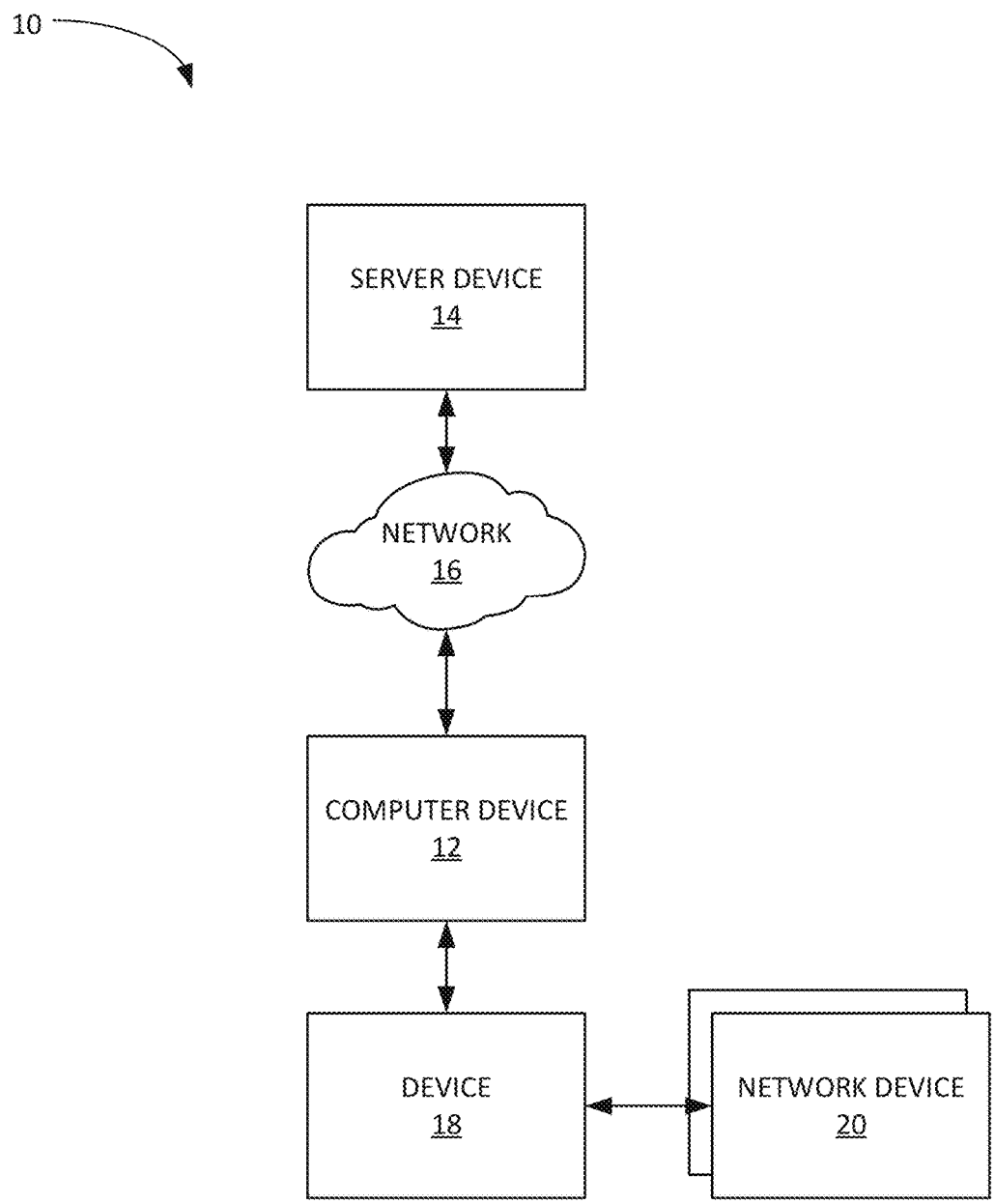
FIG. 1 shows a system for erasing data from network devices, according to some embodiments.

FIG. 1 shows a system 10 for erasing data from network devices, according to some embodiments. The system 10 can be used for the operations described in accordance with the methods described herein for erasing data from a network device.

The system 10 can include a computer device 12 in communication with a server device 14 through a network 16. The system 10 can also include a device 18 for connecting a network device 20 for erasure.

The computer device 12 can include an application that permits a user to connect the network device 20, reset the network device 20 to its factory settings, and erase user-addressable storage locations of the network device 20. Erasing these locations can, for example, remove any configuration settings that a prior user had saved on the network device 20. The resetting and erasing can be performed, for example, on a network device 20 that has been received for refurbishing or the like. The computer device 12 includes a display for showing progress and reporting statuses of the resetting and erasing. Example GUIs are shown and described in additional detail below. The computer device 12 may include a portion of the resetting and erasing functionality, while another portion may require interaction with the server device 14. This can, for example, prevent hijacking of the process at the computer device 12 or other unauthorized resetting and erasing of the network device 20.

The server device 14 can include an application that permits the user to reset and erase the network device 20. In some embodiments, the application on the server device 14 can receive one or more details of device information from the computer device 12 and be configured to provide one or more configuration files to the computer device 12 in return. Collectively, the computer device 12 and the server device 14 can reset and erase the network device 20.

The network 16 may be referred to as the communications network 16. Examples of the network 16 include, but are not limited to, a local area network (LAN), a wide area network (WAN), the Internet, or the like. The computer device 12 can transmit data via the network 16 through a wireless connection using Wi-Fi, Bluetooth, or other similar wireless communication protocols. The computer device 12 can transmit data via the network 16 through a cellular, 3G, 4G, 5G, or other wireless protocol.

In some embodiments, the device 18 is configured to be capable of connecting a plurality of network devices. In some embodiments, the device 18 can be configured to be capable of connecting up to 20 network devices concurrently. In some embodiments, the device 18 can be configured to enable connection of more than 20 network devices. In some embodiments, the device 18 can be configured to enable connection of less than 20 network devices. Additional details about the device 18 are shown and described in accordance with FIG. 3 below.

Figure 2:
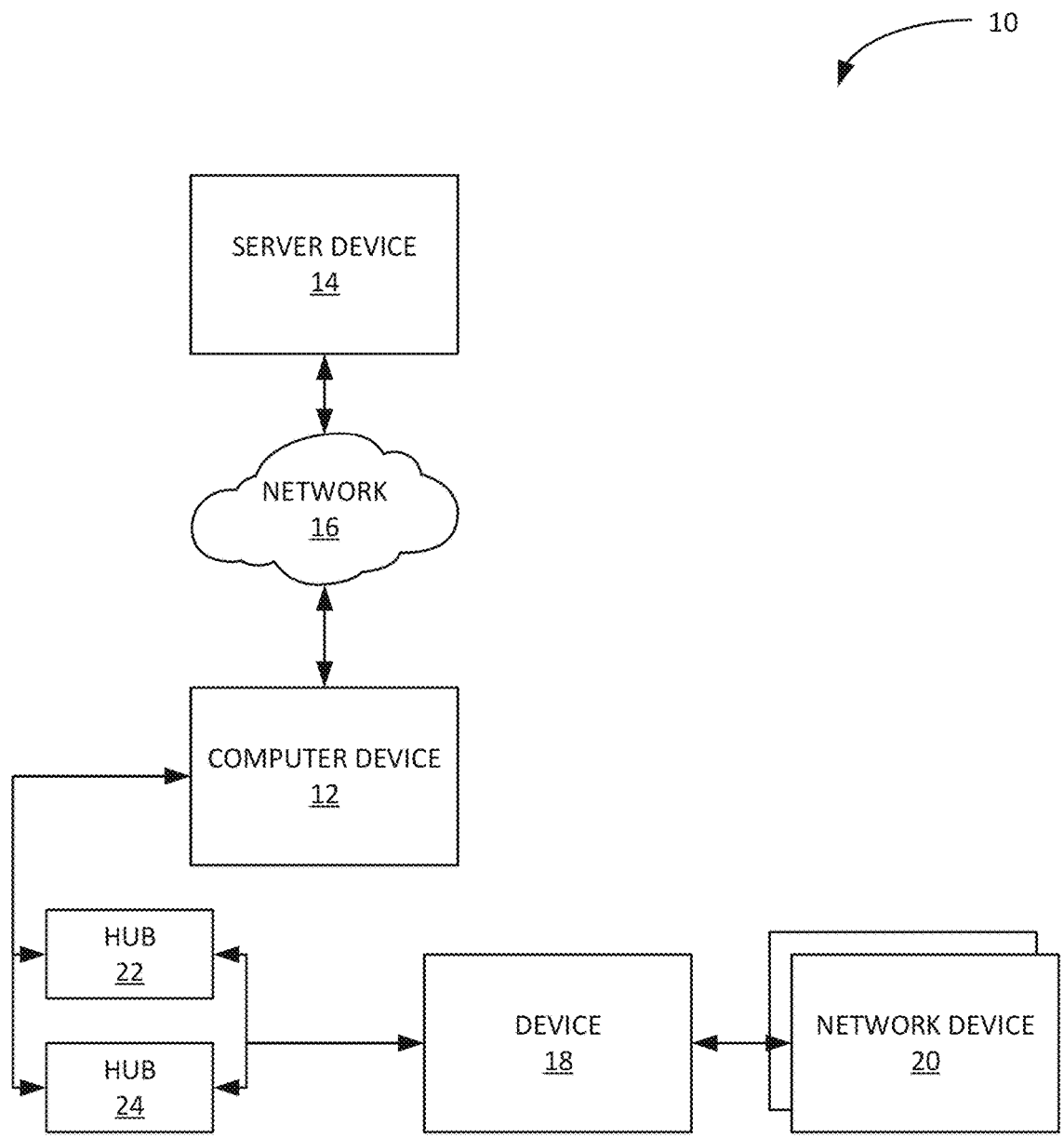
FIG. 2 shows a system for erasing data from network devices, according to some embodiments.

FIG. 2 shows the system 10 of FIG. 1 for erasing data from network devices, according to some embodiments. For simplicity of this Specification, aspects FIG. 2 that have already been described relative to FIG. 1 are not described in additional detail.

As illustrated, the system 10 includes a first hub 22 and a second hub 24.

The first hub 22 is communicatively coupled to the computer device 12. The first hub 22 can be a USB hub configured to provide a plurality of USB connections. In some embodiments, the size of the USB hub can be selected to match a number of ports on the device 18.

The second hub 24 is communicatively coupled to the computer device 12. The second hub can be a switch configured to provide a plurality of ethernet ports. In some embodiments, the size of the switch can be selected to match a number of ports on the device 18.

Figure 3:
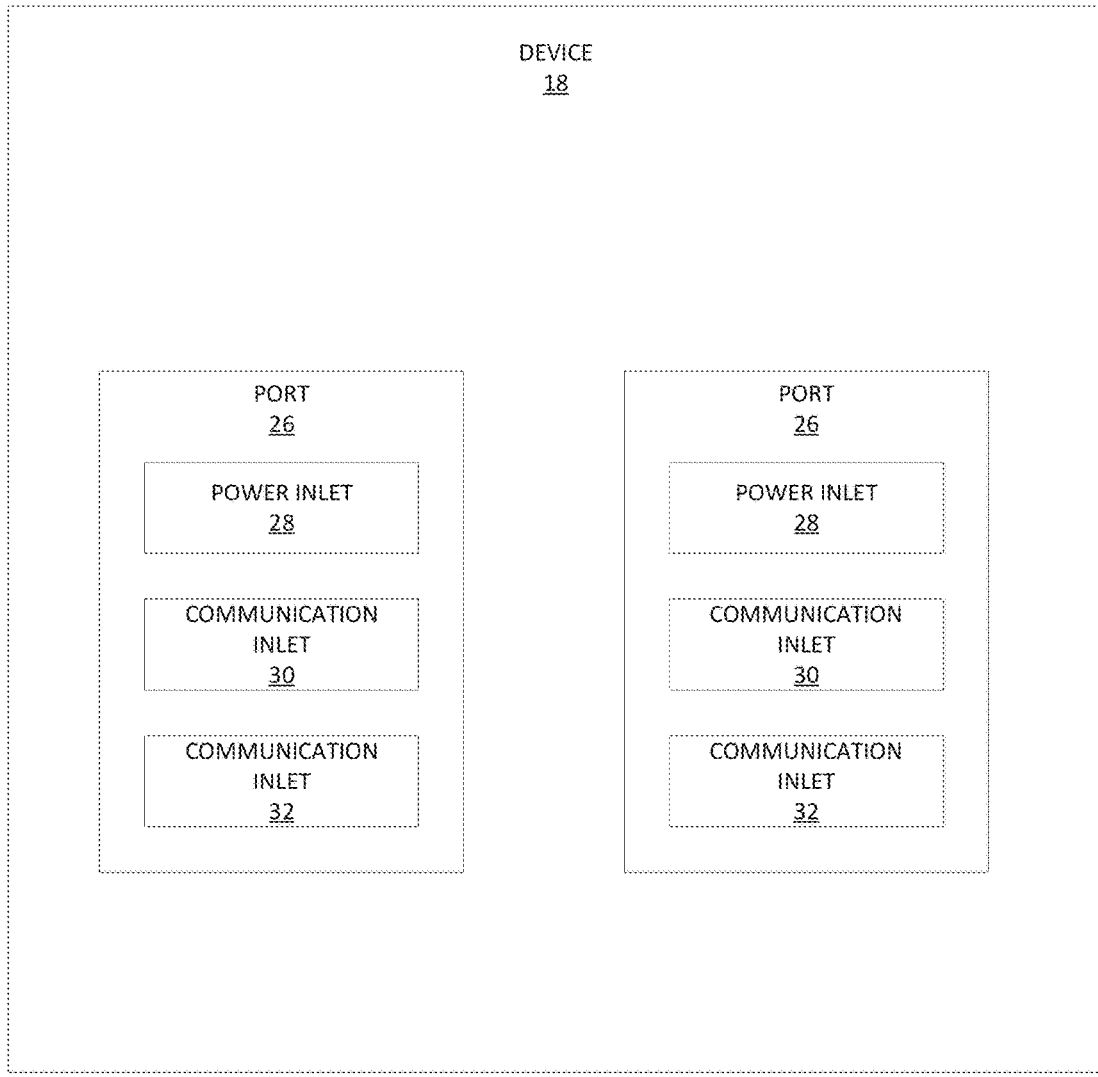
FIG. 3 shows an example device for connecting a plurality of network devices to the system of FIG. 1 or 2, according to some embodiments.

FIG. 3 shows the device 18 for connecting a plurality of network devices to the system 10 of FIG. 1 or 2, according to some embodiments.

The device 18 includes a plurality of ports 26. The number of the ports 26 can be selected to determine a number of network devices (e.g., network device 20 of FIGS. 1-2) that can be connected to the computer device 12 (FIGS. 1-2) concurrently.

Each port 26 includes a power inlet 28, a communication inlet 30, and a communication inlet 32. In some embodiments, the power inlet 28 is configured to receive a power line from a network device. In some embodiments, the communication inlet 30 is configured to enable the network device to communicate with the computer device 12. In some embodiments, the communication inlet 30 can be a universal serial bus (USB) port. In some embodiments, the communication inlet 32 can be an ethernet port configured to receive an ethernet connection from the network device.

Figure 4:
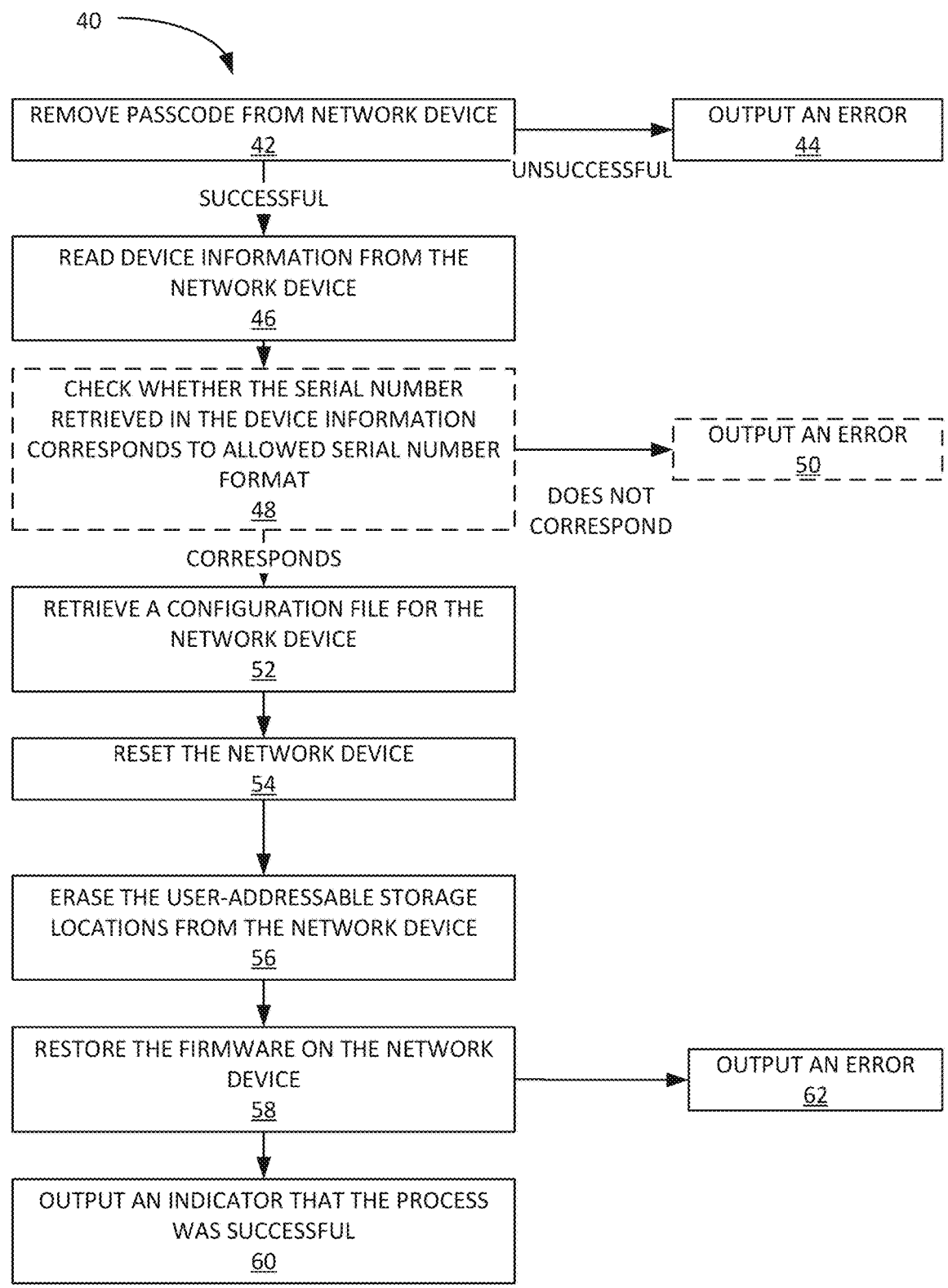
FIG. 4 shows a flowchart of a method for erasing a network device, according to some embodiments.

FIG. 4 shows a flowchart of a method 40 for erasing a network device (e.g., the network device 20 of FIG. 1), according to some embodiments.

At block 42, the computer device 12 removes a passcode from the network device 20. In some embodiments, if the computer device 12 is unable to remove the passcode, the method 40 includes outputting an error at block 44. In some embodiments, the error can be output and displayed on a user interface of the computer device 12.

If the passcode was successfully removed at block 42, the method 40 includes reading device information from the network device 20 at block 46. The device information can include, for example, a model number, a serial number, a MAC address, any combination thereof, or the like.

Optionally, at block 48, the method 40 can include checking whether the serial number retrieved at block 46 corresponds to a format of allowed serial numbers. For example, a range of serial numbers may be indicative of a particular manufacturer or particular device type of the network device 20. The computer device 12 can verify whether the serial number as read corresponds to a subset of serial numbers identified as being allowed. If the serial number does not correspond to the allowed serial numbers, the method 40 can include outputting an indication that the network device 20 cannot be erased at block 50.

If block 48 results in the serial number corresponding to the allowed serial numbers, or the optional block 48 is not present, the method includes retrieving a configuration file for the network device 20 from the server device 14 at block 52.

At block 54, the network device 20 is reset using the configuration file.

At block 56, user-addressable storage locations of the network device 20 are erased. In some embodiments, a 3-pass clearing that is compliant with the National Institute of Standards and Technology (NIST) is performed for the erasing at block 56. In some embodiments, a different number of passes may be used.

At block 58 the firmware is restored on the network device 20. At block 60, if the clearing and the restoration of the firmware were successful, the computer device 12 outputs an indicator that the process was successful. In some embodiments, the output being successful can be displayed in a GUI to the user of the computer device 12 so that the network device 20 can be disconnected. At block 62, if the clearing the restoration were unsuccessful, and error message can be output.

Figure 5:
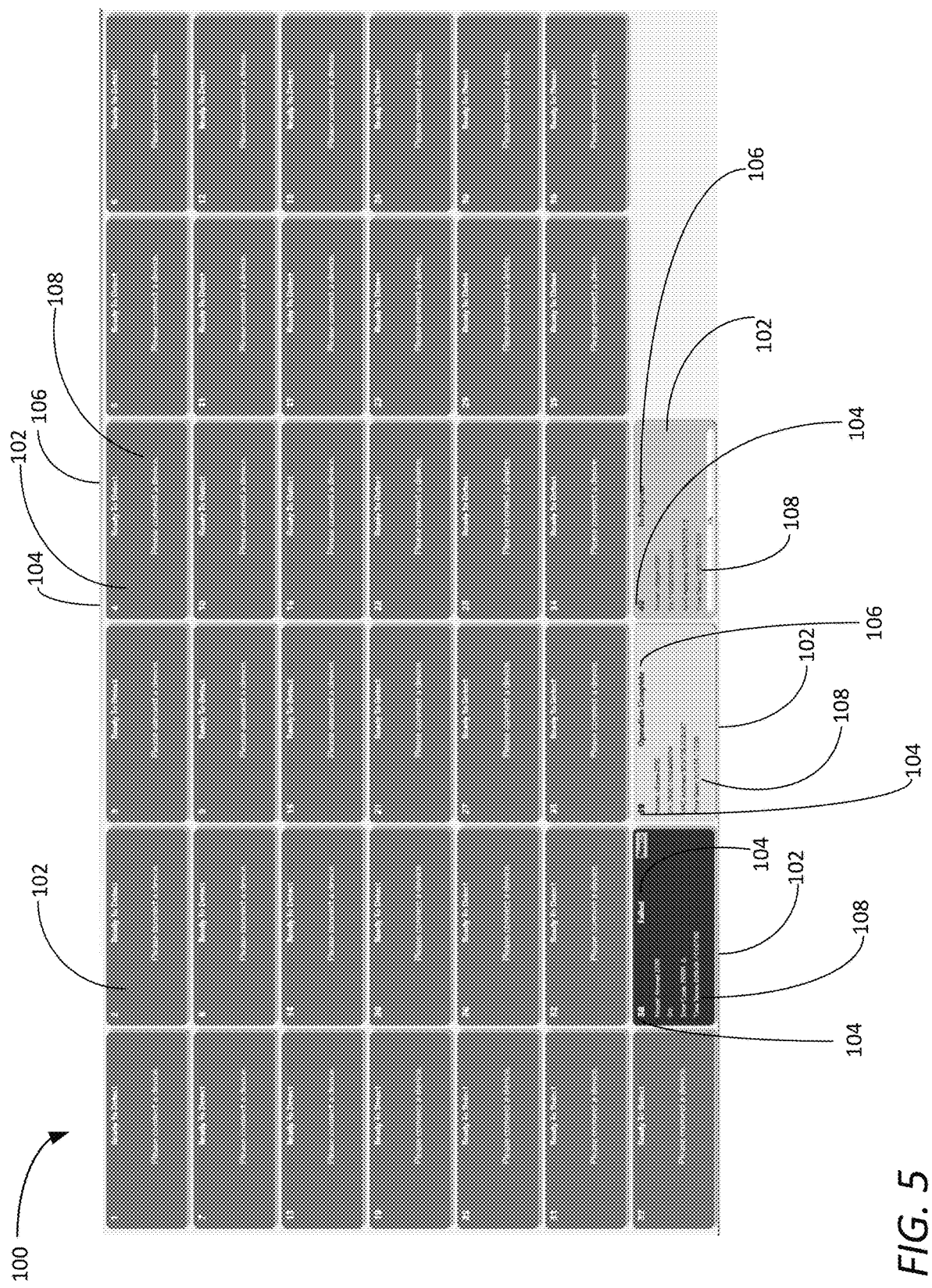
FIG. 5 shows a graphical user interface of the systems of FIG. 1 or 2, according to some embodiments.

FIG. 5 shows a graphical user interface (GUI) 100 of the system 10 of FIG. 1 or 2, according to some embodiments. The GUI 100 can be representative of a status interface for the system 10 (FIGS. 1-2).

The GUI 100 includes a plurality of indicators 102. The plurality of indicators 102 can be based on a maximum number of network devices that are connectable to the computer device 12 (FIGS. 1-2). In the illustrated embodiment, 40 indicators 102 are shown. It is to be appreciated that the number can vary according to the principles described herein. Each indicator 102 includes a device label 104, a status indicator 106, and a status summary 108.

In the illustrated embodiment, the device label 104 for each of the indicators 102 corresponds to a number of the port on the corresponding device for connecting the network devices. For example, in the illustrated embodiment, the device labels 104 range from 1 to 40.

In the illustrated embodiment, the status indicator 106 can include "Ready to Detect," "Failed," "Operation Complete," or "In Progress." It is to be appreciated that these are examples and that the exact text can vary to be representative of statuses including open ports (e.g., ready for a network device to be connected), unsuccessful attempts, completed attempts, or attempts still in progress.

In the illustrated embodiment, the status summary 108 can vary depending on, for example, a current status. For example, in the indicators 102 in which the status indicator 106 is "Ready to Detect," the status summary 108 includes a message indicating that the user can connect a device. In the indicator 102 in which the status indicator 106 is "Failed," the status summary 108 can include information about the device, an error code, any combination thereof, or the like. In the indicator 102 in which the status indicator 106 is "Operation Complete," the status summary 108 can include a model number, serial number, MAC address, duration to complete, any combination thereof, or the like. In the indicator 102 in which the status indicator 106 is "In Progress," the status summary 108 can include a model number, a serial number, a MAC address, a time taken, a status bar indicating a percentage complete, any combination thereof, or the like.

In some embodiments, the indicators 102 can be color coded or the like so that the user can easily differentiate between statuses of the various network devices or open ports.

Figure 6:
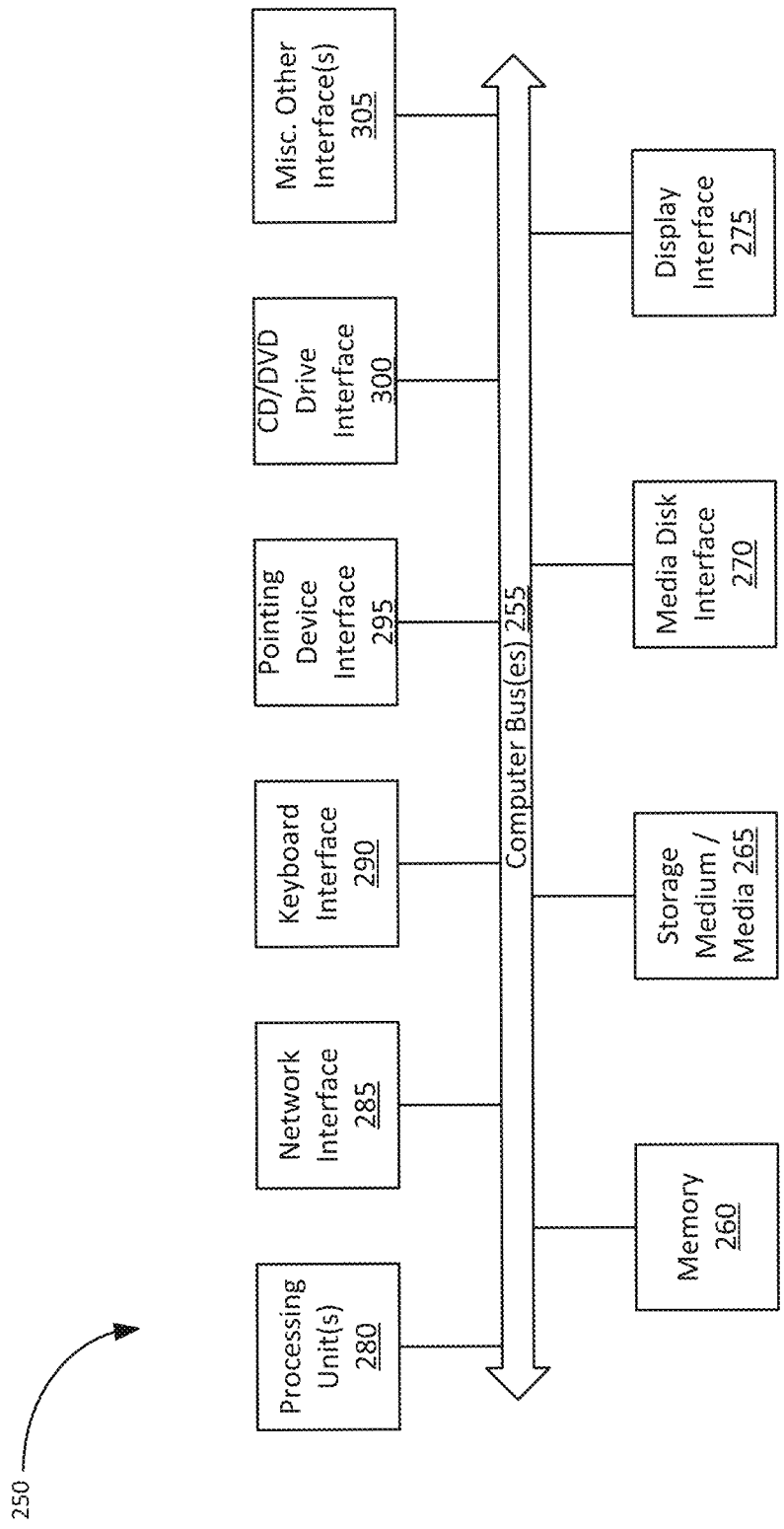
FIG. 6 shows a block diagram illustrating an internal architecture of an example of a computer, according to some embodiments.

FIG. 6 shows a block diagram illustrating an internal architecture of an example of a computer, according to some embodiments. In some embodiments, the computer can be, for example, the computer device 12 and/or server device 14 in accordance with some embodiments. A computer as referred to herein refers to any device with a processor capable of executing logic or coded instructions, and could be a server, personal computer, set top box, smart phone, pad computer or media device, to name a few such devices. As shown in the example of FIG. 6, internal architecture 250 includes one or more processing units (also referred to herein as CPUs) 280, which interface with at least one computer bus 255. Also interfacing with computer bus 255 are persistent storage medium/media 265, network interface 285, memory 260, e.g., random access memory (RAM), run-time transient memory, read only memory (ROM), etc., media disk drive interface 270 as an interface for a drive that can read and/or write to media including removable media such as floppy, CD ROM, DVD, etc. media, display interface 275 as interface for a monitor or other display device, keyboard interface 290 as interface for a keyboard, pointing device interface 295 as an interface for a mouse or other pointing device, and miscellaneous other interfaces not shown individually, such as parallel and serial port interfaces, a universal serial bus (USB) interface, and the like.

Memory 260 interfaces with computer bus 255 so as to provide information stored in memory 260 to CPU 280 during execution of software programs such as an operating system, application programs, device drivers, and software modules that comprise program code, and/or computer executable process operations, incorporating functionality described herein, e.g., one or more of process flows described herein. CPU 280 first loads computer executable process operations from storage, e.g., memory 260, storage medium/media 265, removable media drive, and/or other storage device. CPU 280 can then execute the stored process operations in order to execute the loaded computer-executable process operations. Stored data, e.g., data stored by a storage device, can be accessed by CPU 280 during the execution of computer-executable process operations.

Persistent storage medium/media 265 is a computer readable storage medium(s) that can be used to store software and data, e.g., an operating system and one or more application programs. Persistent storage medium/media 265 can also be used to store device drivers, such as one or more of a digital camera driver, monitor driver, printer driver, scanner driver, or other device drivers, web pages, content files, playlists and other files. Persistent storage medium/media 265 can further include program modules and data files used to implement one or more embodiments of the present disclosure.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method, comprising:
    determining, by a computer device, device information for a network device communicatively coupled to the computer device;
    retrieving, from a server device, a configuration file corresponding to the device information as determined;
    resetting the network device using the configuration file as retrieved;
    clearing user-addressable storage locations of the network device; and
    outputting an indication of whether resetting the network device was successful and whether clearing the user-addressable storage locations of the network device was successful.

2. The method of claim 1, further comprising removing a passcode from the network device prior to determining the device information for the network device.

3. The method of claim 2, wherein in response to removing the passcode from the network device being unsuccessful, further comprising outputting an error message.

4. The method of claim 1, further comprising determining whether a serial number in the configuration file corresponds to a format of allowed serial numbers, and outputting an indication of whether the serial number in the configuration file corresponds to the format of allowed serial numbers.

5. The method of claim 4, wherein in response to determining the serial number in the configuration file does not correspond to the format of allowed serial numbers, outputting an indication that the network device cannot be reset.

6. The method of claim 1, wherein resetting the network device using the configuration file as retrieved comprises performing a factory reset of the network device and backing up firmware of the network device.

7. The method of claim 6, wherein the method further comprises restoring the firmware of the network device after clearing the user-addressable storage locations of the network device.

8. The method of claim 1, comprising displaying the indication of whether resetting the network device was successful and whether clearing the user-addressable storage locations of the network device was successful.

9. The method of claim 1, further comprising:
    determining, by the computer device, device information for a second network device communicatively coupled to the computer device;
    retrieving, from the server device, a second configuration file corresponding to the device information as determined;
    resetting the second network device using the configuration file as retrieved;
    clearing user-addressable storage locations of the second network device; and
    outputting an indication of whether resetting the second network device was successful and whether clearing the user-addressable storage locations of the second network device was successful.

10. The method of claim 9, wherein the second network device and the network device are connected communicatively coupled to the computer device for processing concurrently.

11. A system, comprising:
a processing device, the processing device configured to execute instructions to:
determine, by a computer device, device information for a network device communicatively coupled to the computer device;
retrieve, from a server device, a configuration file corresponding to the device information as determined;
reset the network device using the configuration file as retrieved;
clear user-addressable storage locations of the network device; and
output an indication of whether resetting the network device was successful and whether clearing the user-addressable storage locations of the network device was successful; and
a display device configured to display a graphical user interface (GUI) based on the indication.

12. The system of claim 11, comprising a device, wherein the device comprises a plurality of ports for concurrently communicatively coupling the network device to the computer device along with a second network device.

13. The system of claim 12, wherein each port of the plurality of ports includes a power inlet, a first communication inlet, and a second communication inlet.

14. The system of claim 13, wherein the first communication inlet is a universal serial bus (USB) port.

15. The system of claim 13, wherein the second communication inlet is an ethernet port.

16. The system of claim 11, wherein the processing device is configured to remove a passcode from the network device prior to determining the device information for the network device.

17. The system of claim 16, wherein in response to removing the passcode from the network device being unsuccessful, the processing device is configured to output an error message.

18. The system of claim 11, wherein resetting the network device using the configuration file as retrieved comprises performing a factory reset of the network device and backing up firmware of the network device.

19. The system of claim 11, wherein the processing device is configured to determine whether a serial number in the configuration file corresponds to a format of allowed serial numbers, and outputting an indication of whether the serial number in the configuration file corresponds to the format of allowed serial numbers.

20. A non-transitory computer-readable storage medium comprising instructions, that when executed by a processor, cause the processor to perform a method, comprising:
determining, by a computer device, device information for a network device communicatively coupled to the computer device;
retrieving, from a server device, a configuration file corresponding to the device information as determined;
resetting the network device using the configuration file as retrieved;
clearing user-addressable storage locations of the network device; and
outputting an indication of whether resetting the network device was successful and whether clearing the user-addressable storage locations of the network device was successful.

* * * * *